(12) United States Patent
Teyer

(10) Patent No.: US 11,514,004 B2
(45) Date of Patent: Nov. 29, 2022

(54) PROVIDING A SIMPLE AND FLEXIBLE DATA ACCESS LAYER

(71) Applicant: salesforce.com, inc., San Francisco, CA (US)

(72) Inventor: Paymon Teyer, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 349 days.

(21) Appl. No.: 16/295,217

(22) Filed: Mar. 7, 2019

(65) Prior Publication Data

US 2020/0285619 A1 Sep. 10, 2020

(51) Int. Cl.
*G06F 16/21* (2019.01)
*G06F 16/2455* (2019.01)

(52) U.S. Cl.
CPC ........ *G06F 16/211* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 7,730,478 B2 | 6/2010 | Weissman | |
| 7,779,039 B2 | 8/2010 | Weissman et al. | |
| 8,442,936 B2 * | 5/2013 | Bissantz | G06F 16/21 707/804 |
| 8,447,782 B1 * | 5/2013 | Vipul | G06F 16/252 707/790 |
| 9,384,227 B1 * | 7/2016 | Xiao | G06F 16/278 |
| 9,785,645 B1 * | 10/2017 | Chen | G06F 16/211 |
| 9,922,078 B2 * | 3/2018 | Shiverick | G06F 16/2425 |
| 2010/0088317 A1 * | 4/2010 | Bone | G06F 16/134 707/737 |
| 2012/0179723 A1 * | 7/2012 | Lin | G06F 11/3433 707/792 |
| 2012/0290281 A1 * | 11/2012 | Joshi | G06F 30/33 703/14 |
| 2013/0246436 A1 * | 9/2013 | Levine | G06F 40/279 707/741 |
| 2014/0067824 A1 * | 3/2014 | DeLuca | G06F 16/2255 707/747 |
| 2017/0269875 A1 * | 9/2017 | Kim | G06F 12/0653 |
| 2018/0276288 A1 | 9/2018 | Toal et al. | |
| 2018/0324272 A1 | 11/2018 | Toal et al. | |
| 2019/0065573 A1 * | 2/2019 | Keller | G06F 16/2453 |

* cited by examiner

*Primary Examiner* — Christopher J Raab
(74) *Attorney, Agent, or Firm* — Haynes and Boone, LLP

(57) ABSTRACT

Systems and methods provide a simple and flexible data access layer for an application. The systems and methods receive, at a data access layer associated with an application, a request for accessing data in memory; identify a pattern of the data of the request; determine whether the data access layer includes a table having a structure of one of key/value pair, sorted set, map, or event that is suitable for accessing the data of the request based on the identified pattern. If the data access layer includes a table with suitable structure, using that table for accessing the data of the request. If the data access layer does not include a table with suitable structure, generating a table having the structure of one of key/value pair, sorted set, map, or event; and using the generated table for accessing the data of the request.

18 Claims, 10 Drawing Sheets

600

| KEY (string) | VALUE (byte) |
|---|---|
| object-key-1 602a | b2ggbmljZSwgeW91J3JlIHB1dHRpbmcgZWZmb3J0IGludG8gd GhpcyB0aGluZwo=<br>604a |
| object-key-2 602b | aHVolSB0aGVzZSBhcmUganVzdCBzYW1wbGVzLCB5b3UgZG9 uJ3QgbmVlZCB0byBkbyB0aGlzLg==<br>604b |
| object-key-3 602c | YXJlIHlvdSBzZXJpb3VzbHkgbG9va2luZyB0aGlzIHVwPyE=<br>604b |

PROVIDING A SIMPLE AND FLEXIBLE DATA ACCESS LAYER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a computing device, and more specifically to systems and methods for providing a simple and flexible data access layer.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In a modern computer system, various applications may be run to perform the functions, tasks, routines, etc. of the system. Most applications require some form of persistence, which is typically achieved by storing and retrieving data (e.g., regarding one or more states) into and out of computer memory, such as in the form of a database. A data access layer allows application access to the information or data in the database, but without exposing details of the database to the application. There is several well-known and popular data access object (DAO) layer implementations for a data access layer including java persistent application programming interfaces (JPA)/Hibernate, java object-oriented query (jOOQ), java database connectivity (JDBC), etc. These DAOs or data access layers have evolved to provide many features and functions as well as complex dependencies therein and with other layers in a system, such as presentation and business logic layers. For some relational database systems, these complexities include, for example, joins constructions, and stored procedures. As such, the data access layers may account for a considerable portion of the code in the applications. The aforementioned DAOs are not focused on simplicity and productivity. And they cause accessing, retrieving, writing, or any other query operation or function on the data or information stored in a database to become slow as these query operations or functions combined with complex dependencies therein may lead to long latencies in such functions or operations.

In one example, a cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT). A user may request information from servers operating in the cloud. In an example, the user may request a server to access his/her data (e.g., information about a monitoring status of production servers, etc.) stored in a cloud platform. A data access layer implemented in a server connects to and initializes the cloud platform to enable the user to access his/her stored data. This process becomes slower as the amount of the user's data grows.

BRIEF DESCRIPTION OF THE DRAWINGS

FIG. 6 illustrates an example of a key-value pair table according to some embodiments.

Figure 1:
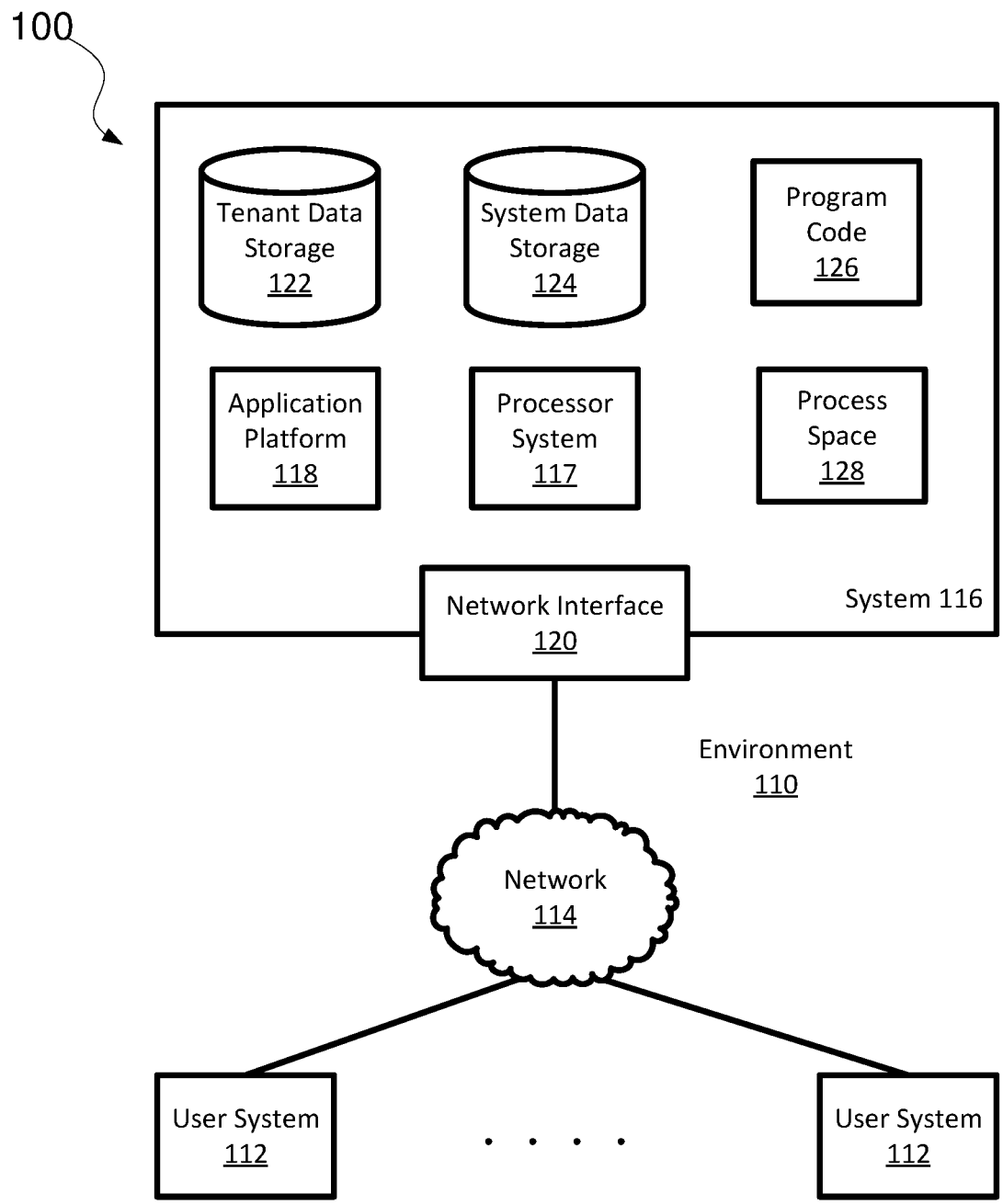
FIG. 1 illustrates a block diagram of an example environment according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

Applications in a computer system require data transfer models or architectures that allow users to access and utilize information stored in a storage system, such as a relational database management system (RDBMS). In some embodiments, a data transfer model may be provided by or implemented with a client-server model such as a customer resource management (CRM) system for one or more businesses or organizations. For instance, an application in a CRM system may allow users to create, view, edit, modify, delete, get status update, and otherwise utilize data or information regarding an organization or customers or potential customers of an organization, sales made to customers, production monitoring information, marketing information, and other types of information that may be relevant to a business or sales development of the organization. A user of a CRM system (e.g., an organization's sales development representative) may want to get a status update of several distributed servers dedicated for storing sales made to the customers of the organization. The user sends a query request to a CRM server via layers of application programming interfaces (APIs) such as a presentation layer, a business logic layer, and a data access layer. The data access layer allows users simplified access to the data stored in a persistent data database. The data access layers are evolved to have many functions and feature and complex dependencies therein. Therefore, when a user sends a query request to an RDBMS, the query request operation combined with complex dependencies therein usually leads to long latencies in the query request operation.

To address this problem, according to some embodiments, systems and methods are described to provide a simple and flexible data access layer for applications. There are a handful of commonly used patterns by which applications access data including, storing and retrieving single objects (e.g., user information); storing and retrieving collections of data (e.g., list of users in a certain group); and storing and retrieving temporal data points (e.g., metric values, or Internet of Things (IoT) events). The data access layer of the present disclosure provides a set of simple yet powerful abstractions that can be used to address essential needs for the above-mentioned patterns or use cases. The implementation focuses on simplicity and usability. For certain applications, where appropriate, the systems and methods can significantly reduce the size of the data access layer implementation for the applications.

According to some embodiments, an engine for the data access layer defines a list of object-oriented mapping application programming interfaces (ORM APIs) that allow users to persist and query data stored in one of the following forms or data structures of key/value pairs or objects, sorted sets of entries, maps, and fat events (time series databases) and they are straight forward to implement simply and efficiently on top of relational databases, such as, for example, MySQL and H2, as well as a client/server model on top of gRPC and hypertext transfer protocol (HTTP). As such, the data access layer engine eliminates some of the complexities around relational databases, such as joins, constraints, and stored procedures. In this way, the query operation for an application potentially becomes faster.

Example Environment

The system and methods of the present disclosure can include, incorporate, or operate in conjunction with or in the environment of a database, which in some embodiments can be implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously support multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture, therefore, allows convenient and cost-effective sharing of similar application features between multiple sets of users.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects.

A relational database management system (RDBMS) or the equivalent may execute storage and retrieval of information against the database object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the servers that are accessing that server, each of the plurality of servers has access to the MTS data; however, other alternative configurations may be used instead. In some implementations, in global applications, HTTP server may be implemented with remote procedure call (RPC) or global RPC (gRPC) where several continental servers such or gRPC servers are being monitored by a main CRM server (e.g., CRM system 116).

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a MTS, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 116 may provide tenant access to multiple hosted (standard and custom) applications, including a CRM application. User (or third-party developer) applications, which may or may not include CRM, may be supported by the application platform 118, which manages creation, storage of the applications into one or more database objects, and execution of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 includes conventional, well-known elements that are explained only briefly here. For example, each of the user systems 112 could include a desktop personal computer, workstation, laptop, notepad computer, personal digital assistant (PDA), cell-phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the MTS) of the user systems 112 to access, process, and view information, pages, and applications available to it from the system 116 over the network 114. Each of the user systems 112 also typically includes one or more user interface devices, such as a keyboard, mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise, allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit (CPU) such as an Intel Pentium® processor or the like. Similarly, system 116 (and additional instances of an MTS, where more than one is present) and all of their components might be operator configurable using application(s) including computer code to run using a CPU such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data, and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented database management system (OODBMS) or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
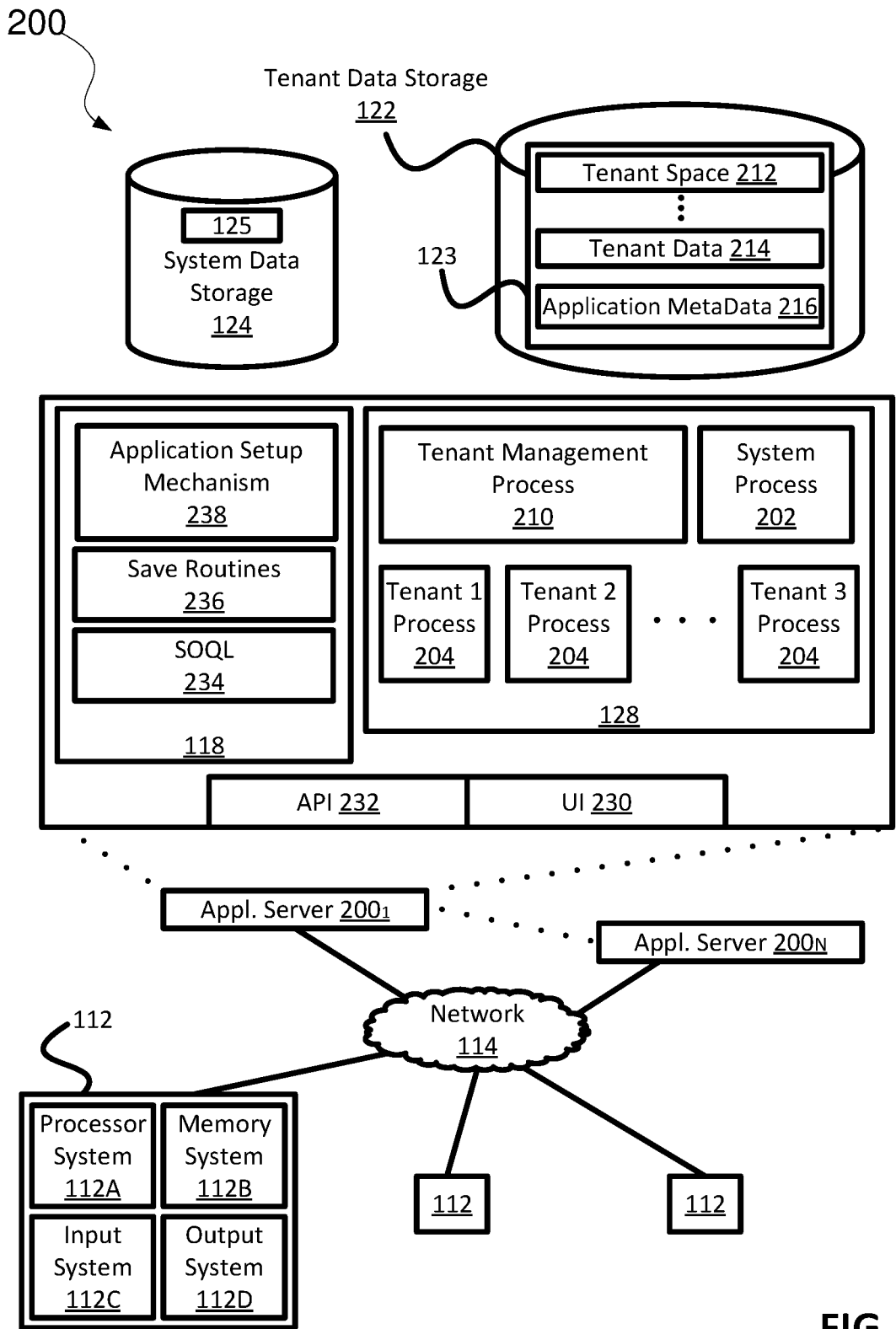
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a Salesforce.com object query language (SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIGS. 1 and 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access the tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process space 210, for example. Invocations to such applications may be coded using SOQL 234 that provides a programming language style interface extension to the API 232. Some embodiments of SOQL language are discussed in further detail in U.S. Pat. No. 7,730,478, filed September 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. TCP/IP are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database. In some examples, the system 116 may use MySQL relational database management system statements to access the desired information.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a CRM system, for example, these categories or groupings can include various standard entities, such as account, contact, lead, opportunity, group, case, knowledge article, etc., each containing pre-defined fields. For example, a CRM database may include a table that describes a customer with fields for basic contact information such as name, address, phone number, fax number, etc. Another table might describe a purchase order, including fields for information such as customer, product, sale price, date, etc. In some MTS, standard entity tables might be provided for use by all tenants.

In some MTSs, tenants may be allowed to create and store custom objects, or they may be allowed to customize standard entities or objects, for example by creating custom fields for standard objects, including custom index fields. Systems and methods for creating custom objects as well as customizing standard objects in an MTS are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Persistent and Flexible Data Access Layer Implementations

Figure 3:
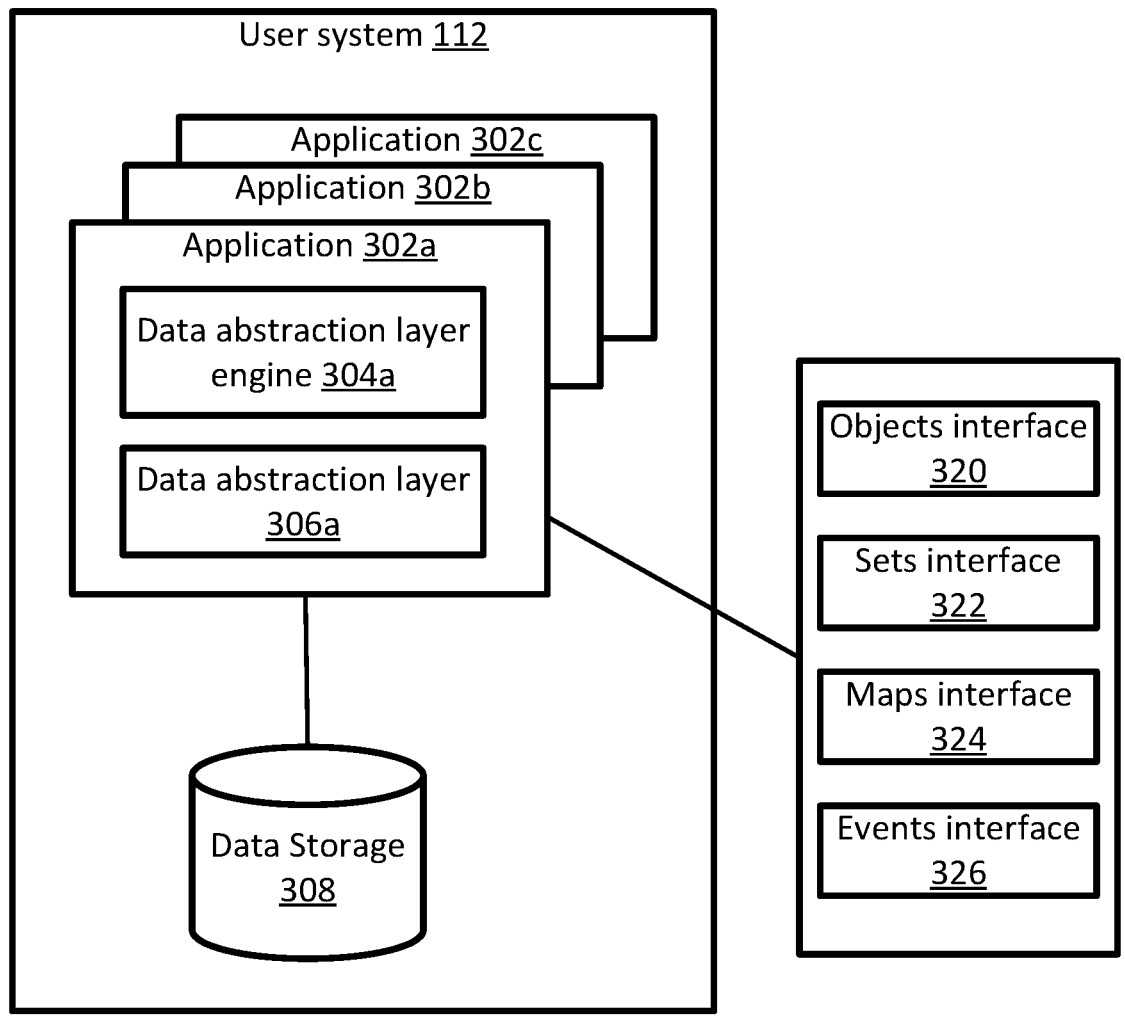
FIG. 3 illustrates a block diagram of a system for an implementation of a data abstraction layer according to some embodiments.
Figure 4:
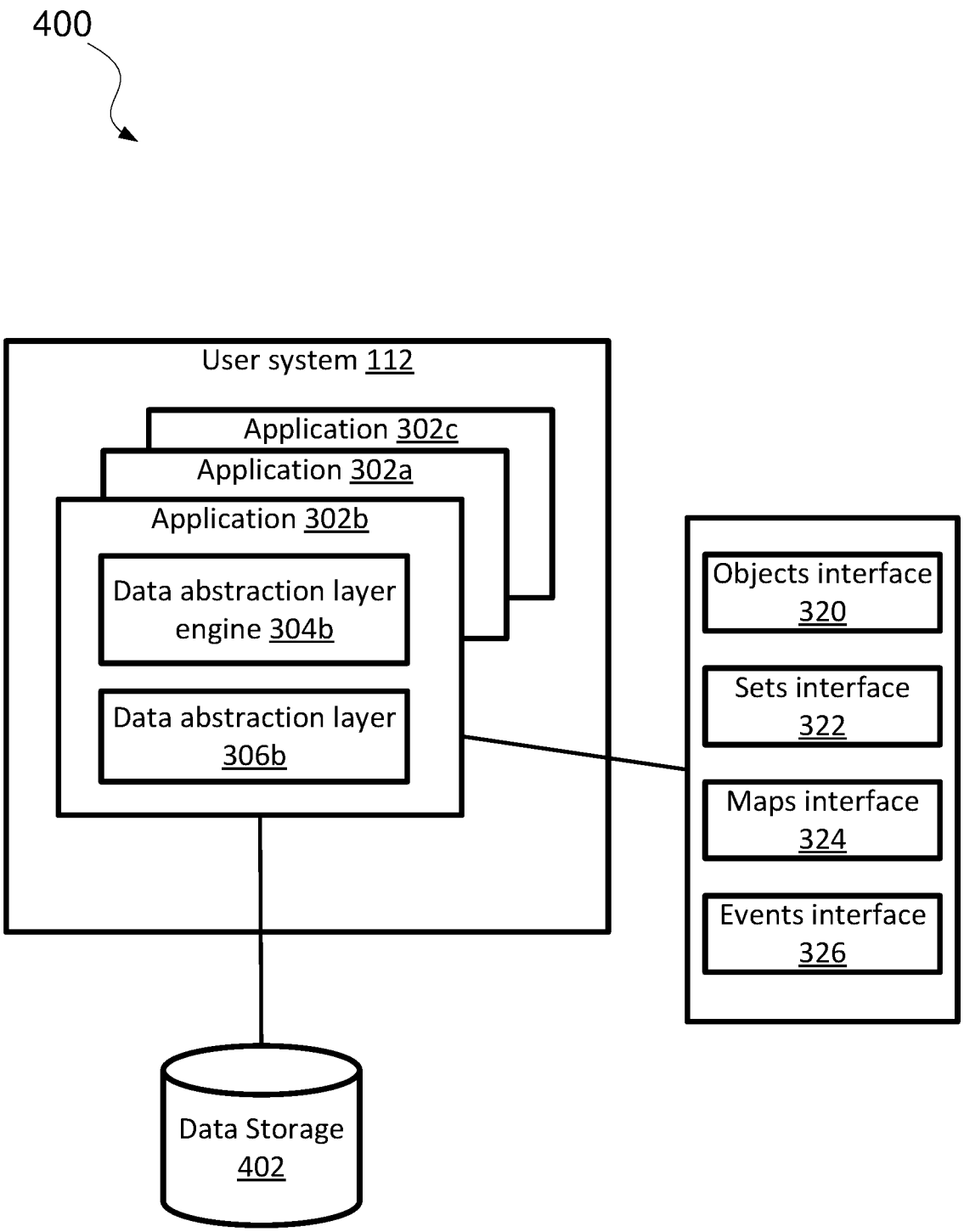
FIG. 4 illustrates a block diagram of another system for an implementation of a data abstraction layer according to some embodiments.
Figure 5:
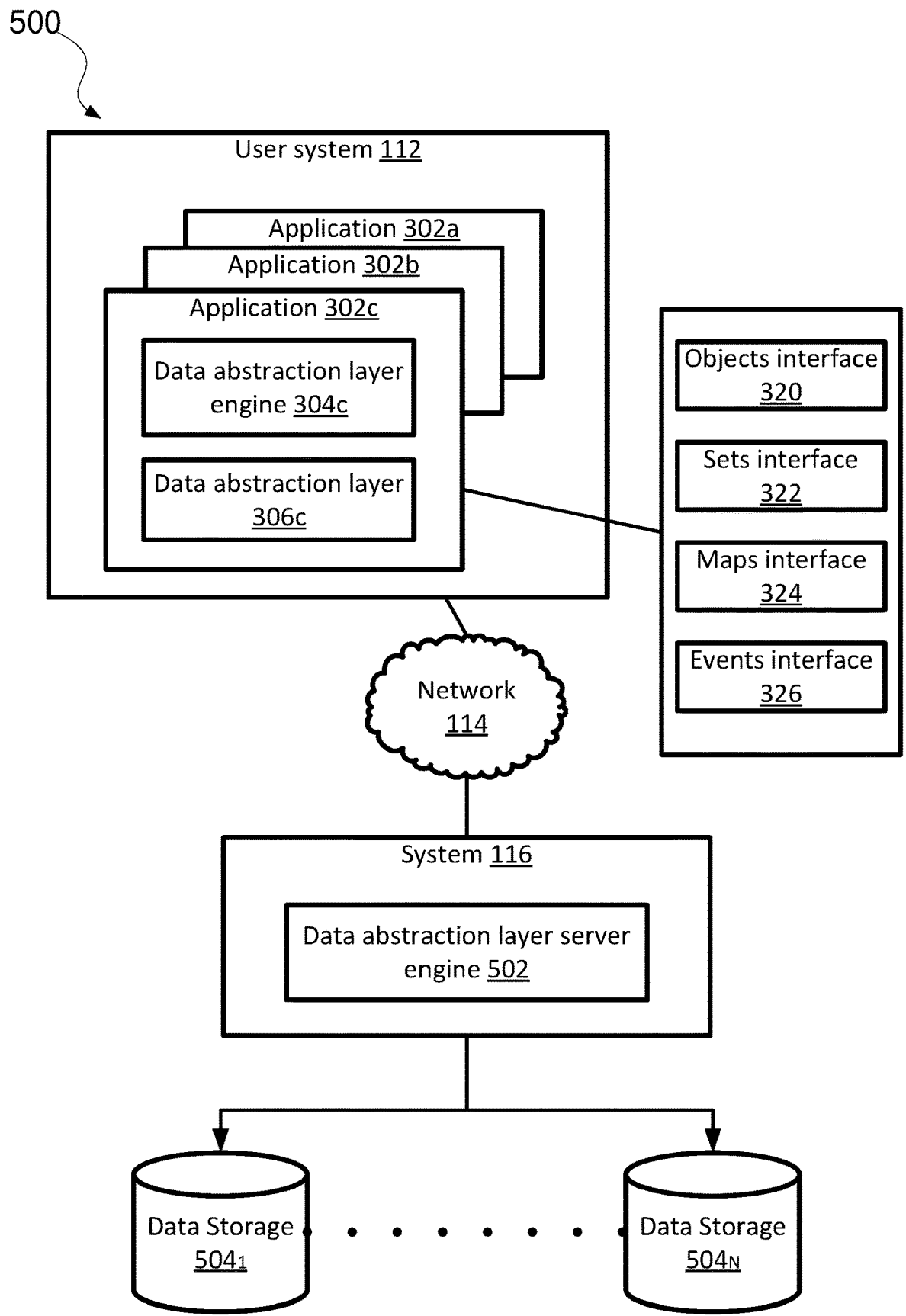
FIG. 5 illustrates a block diagram of another system for an implementation of a data abstraction layer according to some embodiments.

Referring to FIGS. 3 to 5, in computing devices such as user systems 112, one or more applications 302 can be run to provide for various functions, operations, tasks, etc. In a CRM system, such as that described with reference to FIGS. 1 and 2, for example, these functions or operations provided by an application 302 may relate to customer support, sales, proposals, etc. For these functions, operations, tasks, etc., the applications 302 may use or store various data or information. In a CRM system, for example, this information may include information about an organization's customers, sales made to customers, monitoring a production process, monitoring an organization's server metrics, etc. The information or data relating to or used by, the applications 302 may be stored in one or more storage systems. Such storage systems can be an embedded database (e.g., in-memory data storage in the user system 112, as shown in FIG. 3), an external database (e.g., an external hard drive connected to the user system 112, as shown in FIG. 4), or in distributed databases (e.g., CRM databases, as shown in FIG. 5).

Each application 302 may include or be provided with a respective data access layer to provide for accessing, storing, and other query operations on data or information stored in the one or more storage system (e.g., databases). For some applications, the data access layer can make up the majority of the implementation or code of the application. This data access layer typically contains code to initialize and connect to the storage system; a mapping to/from the layout of the data in storage and the corresponding representation in the application; and also, composing and executing query functions against the storage system, handling edge cases, handling exceptions, etc.

Typically, the data access layer includes a data abstraction layer that performs the composing and executing query functions for the application. The data abstraction layer can be an object-relational mapper (ORM) that hides the complexity of the data access layer code and unifies the communication between an application and difference databases eliminating the need to use different database vendors for each database (e.g., H2, MySQL, SQLite, SQL Server, DB2, MySQL, PostgreSQL, Oracle, etc.). The data abstraction layer utilizes libraries, tables, and other data structures, with corresponding schemas, indices, functions, and features, for the data access and retrieval into and out of the storage systems. These libraries, tables, data structures, etc. may cross-reference each other, have complex dependencies with each other, and refer to other structures with their schemas, indices, functions, and features. Thus, when an application sends a query request to the database, the data abstraction layer uses look-up tables or hash functions to find and send the requested data back to the application. If the data abstraction layer does not include a table with the data format, data structure, and/or schema of the requested data, the data abstraction layer creates or uses the cross-references and dependencies between the available tables or libraries to find or store the data with a data structure that the user is interested in receiving, storing, writing, etc. Such dependencies create complexities that can slow down the query operation.

To address this, according to some embodiments, systems and methods are provided for generating a persistent and flexible data access layer that focuses on simplicity and usability. There are a handful of commonly used patterns by which applications access data including:

Storing and retrieving single objects (e.g., user information). The data stored is usually relatively small. It can be, for example, a JSON object, a serialized protobuf object, or any other form of data that can be converted to a byte array. Key/value storages, such as BerkeleyDB or Redis, can be used for this purpose.

Storing and retrieving collections of data (e.g., list of users in a certain group). Relational databases or indexing engines can be used for this purpose.

Storing and retrieving temporal data points (e.g., metric values, or Internet of Things (IoT) events). Time-series databases, such as Elastic Search, InfluxDB, OpenTSDB, or Prometheus, can be used for this purpose.

The data access layer of the present disclosure provides a set of simple yet powerful abstractions that can be used to address essential needs for the above-mentioned patterns or use cases. For certain applications, where appropriate, the systems and methods can significantly reduce the size of the data access layer implementation for the applications.

According to some embodiments, an engine for the data access layer defines, provides, or implements a set of simple interfaces (APIs) that allow users to persist and query data stored in one of the following forms or data structures: key/value pairs or objects, sorted sets of entries, maps, and fat events (timeseries data). These data structures can be used to solve variety of use-cases for applications; and they are straight forward to implement simply and efficiently on top of relational databases, such as H2, MySQL, SQLite, SQL Server, DB2, MySQL, PostgreSQL, Oracle, as well as a client/server model on top of gRPC and HTTP. As such, the data access or abstraction layer engine eliminates or reduces some of the complexities around relational databases, such as joins, constraints, and stored procedures.

According to some embodiments, the data access layer includes a data abstraction layer which is configured to include tables or libraries with data structures and/or schemas the same as or similar to data structures and/or schemas of the requested information when the data structures and/or schemas of a requested information do not match the data structures and/or schemas of any of the current tables or libraries of the data abstraction layer.

The systems and methods abstract the creation of a persistent and flexible data access layer. In some embodiments, the systems and methods provide for the creation of a persistent data access layer with a data abstraction layer that is configured to be flexible and be modified to include or utilize new tables or libraries with data structure and/or schema matching a data structure, schema, or pattern of data that a user wants to store, write, update, etc. in a database. The data abstraction layer may be different in every application based on the data types, data formats, data patterns, data structures and/or schema of the requested data. The data abstraction layer may include or define APIs using abstract data structures such as key-value pair objects, sorted set objects, map objects, and event objects. In a case that the data abstraction layer includes a table with the data structure and/or schema of the requested data, the data abstraction layer uses that table to provide the requested data to the user. In a case that the data abstraction layer does not include a table with the data structure and/or schema of the requested data, the data abstraction layer is configured to include or utilize a new table with the data structures and/or schema of the requested data. The tables are named based on their data patterns, data formats, data structures, and/or schema. As such a hash function and a hash table may be implemented to find a table with data structures and/or schema of the requested data.

With reference to FIGS. 3 to 5, in some embodiments, systems 300, 400, and 500 are implemented in one or more computing devices, such as servers, desktops, laptops, notebooks, smartphones, and the like. Each computing device may include one or more processors coupled to or in communication with memory. Operation of the one or more computing devices is controlled by the processors. The processors may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing devices.

FIG. 3 illustrates a block diagram of a system 300 for implementing a persistent and flexible data abstraction layer according to some embodiments. According to some embodiments consistent with FIGS. 1 and 2, system 300 includes a computing device such as user system 112 which includes applications 302a-c, where each application 302a-c includes a respective data abstraction layer engine 304a-c and a data abstraction layer 306a-c, and a data storage 308.

In some embodiments, an application 302a may be an application that requires or uses a small data storage (e.g., below 1 Giga bytes (Gb)) to store information or data. In some embodiments, the application 302a is configured to access an embedded data storage 308 resident within the user system 112. For example, the application 302a may be a heart rate monitoring application that stores the records of the user's heart rate on an embedded data storage 308 resident in the user system 112. In another example, the application 302a may be a data application such as "Contacts" that stores the user's business clients, coworkers, friends, etc. that are stored in the data storage 308. In another example, the application 302a may be a customer activity monitoring application (e.g., "Salesforce Connect" and "Customer Connect") in which H2 database is used to maintain records of customer's purchase activities on locally on the application 302a.

The data abstraction layer 306a is generated to be compatible with a relational database management system (e.g., H2) that is used for interacting and performing query methods or operations on the data available on the application 302a and data stored in data storage 308. Data storage 308 can be implemented, for example, with volatile or non-volatile memory medium or device as is well known, such as a hard-disk drive (HDD) or random-access memory (RAM), capable of being provided on or implemented in a user device 112 and suitable for storing instructions and/or data. Data storage 308 may be include or be provided with a local host or local storage system such as in-memory database java database connectivity (JDBC)). In some embodiments, the data storage 308 interfaces with the application 302a via, for example, H2 or any other suitable RDBMS used to maintain the APIs in data abstraction layer 306a.

In some embodiments, the data abstraction layer engine 304 can be implemented as or include a library on top of the H2 or other database. The data abstraction layer engine 304 detects or identifies the data, as well as its structure, schema, form, and/or pattern (e.g., single object, collection, or temporal data points) that is queried or requested by the application 302 or the user interacting with the same. According to some embodiments, the data abstraction layer engine 304 allows users or the application 302 to persist and query data stored in one of the following forms: key/value pairs, sorted sets, maps, and fat events, as appropriate or suitable for the pattern of the queried data.

In a key/value pair, the key is a unique string and the value is an arbitrary byte array. This is consistent with other key/value storage solutions. The data abstraction layer engine 304 may implement or perform methods or functions that allow the user or application to create and drop namespaces, as well as persist and retrieve objects, for key/value pairs. An example of a table 600 for a key/value pair is shown and described with reference to FIG. 6.

For sorted sets, each set is identified with a unique string as the set name, and a number of entries, each associated with a numerical value as the weight of the entry. The data abstraction layer engine 304 may implement or perform methods or functions on the sorted sets that allow the user or application to create and drop namespaces, as well as slice and paginate sets based on the weight of the entries. An example of a table 700 for a sorted set is shown and described with reference to FIG. 7.

Each map can be a series of key/value pairs. Most objects can be readily represented as a map of property name to property value. The data abstraction layer engine 304 may implement or perform methods or functions on maps that allow a user or application to create and drop namespaces, as well as store or retrieve maps containing pairs matching a certain pattern. An example of a table 800 for a map is shown and described with reference to FIG. 8.

Each fat event can include or relate to multi-dimensional time-series data points, where each data point has a timestamp along with an arbitrary list of metadata (key/value strings), a number of dimensions (double values), and a payload (arbitrary byte array). An example of a table 900 for fat events is shown and described with reference to FIG. 9.

In some examples, the data abstraction layer 306 may include one or more tables of abstractions or APIs such as the key-value pair objects table 600, the sorted set objects table 700, the map objects table 800, and/or the event objects table 900 with reference to FIGS. 6 to 9.

The data structures or forms of key/value pairs, sorted sets, maps, and fat events can be used to solve variety of use-cases or patterns of data (e.g., single objects, collections, or temporal data points) for applications 302, and they are straight forward to implement simply and efficiently on top of a relational database. Data abstraction layer engine 304 provides this implementation. It also eliminates or reduces some of the complexities around relational databases, such as joins, constraints, and stored procedures. Data abstraction layer engine 304 can provide a simple and powerful set of abstractions for applications or users to more simply and flexibly store and retrieve data or information, thus enabling the users to be able to spend more time on the application's business logic.

According to some embodiments, for each query made by an application 302 to store or retrieve data, data abstraction layer engine 304 determines whether the data structures and/or schemas of the available tables or libraries in the data storage 308 matches the data structure, schema, or pattern of the queried data. In some embodiments, data abstraction layer engine 304 searches hash tables with hash functions to find a table with a name that represents the data structure and/or schema of the queried data. In some embodiments, the data abstraction layer engine 304 further determines whether the data structure of the queried data can be abstracted into the data structure and/or schema of any of the tables already available in the data abstraction layer 306.

If the data abstraction layer engine 304 finds the table with the same or suitable matching data structure and/or schema as the queried data, the data abstraction layer 306 uses the found table to perform the requested query operation. Alternatively, if the data abstraction layer engine 304 does not find a table in the data abstraction layer 306 that corresponds to the same or suitable data structure and/or schema as the queried data, the data abstraction layer engine 304 adds or generates a new table with the matching data structure and/or schema as the queried data or information.

That is, in some embodiments, if the data abstraction layer 306 does not include a table with a matching data structure and/or schema of the queried data or the queried data cannot be abstracted into any of the tables present in the data abstraction layer 306, data abstraction layer engine 304 adds a new table with a matching data structure and/or schema of the requested information or data. According to some embodiments, the data abstraction layer engine 304 names the tables resident in the data abstraction layer 306 based on their data types, data formats, data patterns, data structures, and/or schema. Similarly, the data abstraction layer engine 304 names the new table based on its data types, data formats, data patterns, data structures, and/or schema.

According to some embodiments, to accomplish this, the data abstraction layer engine 304 implements, exposes, or provides one or more interfaces for a user (e.g., administrator) of application 302 to interact with the data access layer or data abstraction layer 306 to add or generate a new table with the matching or suitable data structure and/or schema as the queried data. In some embodiments, as shown, these interfaces include an objects interface 320, a sets interface 322, a maps interface 324, and an events interface 326, which provide or support the data forms of, respectively, key/value pairs, sorted sets, maps (key/value pairs), and fat events (time-series data). Each interface 320-326 can be implemented as an application programming interface (API).

In some embodiments, each interface 320-326, or the method implemented thereby, expects a <namespace> parameter which can be used to slice or organize data into multiple physically separate databases. A namespace must be first created by making a call to a <create(namespace)> method. It is also possible to drop the whole namespace by calling <drop(namespace)> after which point any call to that namespace will result in <IOException>.

Objects: Data in the pattern of objects can be stored in a table with two columns: a string column for the key, and a blob column for the value, as shown, for example, in the table 600 of FIG. 6. In some embodiments, objects interface 320 defines, for example, the following operations on key/value pairs:
  create/drop—to create a new namespace (i.e., database) or to delete a namespace.
  store/get/delete—to store, retrieve, and delete a single or a batch of key/value pairs.
  keys—to get the list of all keys in a namespace; for example, calling keys against the above table would return a list of strings containing {'object-key-1', 'object-key-2', 'object-key-3'}.
  size—to get the count of all objects stored in the namespace.

Sets: Data in the form or pattern of collections can be stored in the structure of sorted sets or maps. Sorted sets are stored in a table with three columns: a string column for the set name, a string column for the entry, and a long column for the weight associated to the entry, as shown, for example, in the table 700 of FIG. 7. In some embodiments, sets interface 322 defines, for example, the following operations on sorted sets:
  create/drop—to create a new namespace (i.e., database) or to delete a namespace.
  add/delete—to add an entry with a weight to a set, or to remove an entry from a set.
  entries/get—to retrieve entries or pairs of entry/weight from a set, where their weight is between two given values, and are ordered either ascending or descending. It is also possible to paginate through the results. For example, calling <entries> for the sample-set-1 against the above table returns a list of strings containing {'entry-1', 'entry-2', 'entry-3'}; and calling <get> on the same, returns {'entry-1'=>0, 'entry-2'=>1, 'entry-3'=>2}.
  union/intersect—to get the union or intersection of multiple sets.
  pop—to atomically retrieve and remove entries from a set; this is particularly useful for using sorted sets as a producer/consumer buffer or similar use cases.

Most operations for the sets interface 322 support ranges. A range is described as count entries with weight between a minimum and a maximum value, starting from the start index; for example making a <get> call similar to this: get(namespace, 'sample-set-1', 1, Long.MAX_VALUE, 0, 3, true) against the above dataset, returns maximum of 3 entries from the sample-set-1 where weight is between 1 and Long.MAX_VALUE starting from index 0, ordered ascending.

Maps: Maps are stored as multiple records in a table with columns representing each key in the map, as shown, for example, in the table 800 of FIG. 8. In some embodiments, maps interface 324 defines, for example, the following operations on maps:
  create/drop—to create a new namespace (i.e., database) or to delete a namespace.
  store/delete—to store a new map with a given key, or delete the map.
  get—to retrieve maps given a query object which can define criteria to match against.

Events: Data in the form or pattern of temporal data points can be stored in the structure of events. Events represent multi-dimensional timeseries data points, with arbitrary metadata key/value pairs, and optionally a byte[ ] payload attached to an event, as shown, for example, in the table 900 of FIG. 9. In some embodiments, events interface 326 defines, for example, the following operations on events:
  create/drop—to create a new namespace (i.e., database) or to delete a namespace.
  store—to store a new event in the namespace.
  get—to fetch events in the namespace, matching a query; the queries are defined as a map of key/value pairs, where the key is either a dimension key name or a metadata key name (e.g., Host or CPU in the example of Table 900), and values are either literal values to match exactly with (e.g., Tenant=>'tenant-1') or an operator along with a value (e.g., Tenant=>'~tenant-*' or CPU=>'>0.30').

expire—to expire all events in the namespace with timestamp before some value.

count—to count number of events in the namespace, matching a query.

aggregate—to retrieve aggregated values of a dimension matching a query.

metadata—to retrieve metadata values for a given metadata key for events matching a query.

payloads—to retrieve byte[ ] payloads for all events in the namespace matching a query.

In some embodiments, events are internally bucketed or grouped into 1-hour intervals and stored in separate tables based on the different dimensions and metadata keys associated to an event. For example, an event with dimension <d1> and metadata <m1> is stored in a separate table than one with dimension <d2> and metadata <m2>.

In some embodiments, all the tables of the data abstraction layer 306 may be stored in a hash table and may be found by a hash function based on their names.

According to some embodiments, the data abstraction layer engine 306 also provides or supports a number of utility classes implemented on top of the basic data structures; these are basic implementations for some of the commonly used patterns, such as, for example, a simple implementation of streams or queues.

FIG. 4 illustrates a block diagram of a system 400 for implementing a persistent and flexible data abstraction later according to some embodiments. According to some embodiments consistent with FIGS. 1 to 3, system 400 includes a computing device such as user system 112 which includes applications 302a-c, where the application 302b includes a data abstraction layer engine 304b and a data abstraction layer 306b, and a data storage 402.

Application 302b may be an application that requires or uses a medium size data storage (e.g., between 1 to 50 Gb) to store data or information. In some embodiments, the application 302b may be configured to access a data storage 402. For example, the application 302b may be a residential IoT monitoring application that monitors, records and updates the status of the mesh of deployed sensors that are paired with the application 302a. In another example, the application 302b may be a server metrics monitoring application that monitors, records, and updates the status of the on-site servers in a data center. In some embodiments, the data abstraction layer engine 304b substantially operates or functions the same as the data abstraction layer engine 304a with reference to FIG. 3.

The data abstraction layer 306b is generated to be compatible with a relational database management system (e.g., MySQL) that is used for interacting and performing query methods or operations on the data available on the application 302b and data stored in data storage 402.

The data storage 402 may be a remote host such as an external hard drive and/or on-site database directly accessible to the user system 112. In some embodiments, data storage 402 can be implemented, for example, with volatile or non-volatile memory medium or device as is well known, such as floppy disks, microdrive, and magneto-optical disks, and magnetic or optical cards, nanosystems (including molecular memory integrated circuits (ICs)), or any type of media or device suitable for storing instructions and/or data.

Data abstraction layer engine 304b can operate similar to the data abstraction layer engine 304a described with reference to FIG. 3.

FIG. 5 illustrates a block diagram of a system 500 for implementing a persistent and flexible data abstraction layer engine according to some embodiments. According to some embodiments consistent with FIGS. 1 to 4, system 500 includes a computing device such as user system 112 which includes applications 302a-c, system 116, one or more (e.g., a cluster of) data storages $504_1$ to $504_N$, and network 114. According to some embodiments, the user system 112 includes a data abstraction layer engine 304c and a data abstraction layer 306c for application 302c. And the system 116 includes a data abstraction layer server engine 502 in support of application 302c and possibly other applications as well. In some embodiments, the data abstraction layer engine 304c operates or functions substantially the same as data abstraction layer engine 304a and 304b with reference to FIGS. 3 and 4.

Application 302c may be an application that requires or uses a large data storage (e.g., above 50 Gb) to store data or information. In some embodiments, the application 302c may be configured to access a cluster of databases or distributed databases such as data storages $510_1$ to $510_N$ accessible to the user system 112 via system 116 and network 114. For example, the application 302c may be a production server monitoring application that monitors, records, and updates the data status of a number of servers (e.g., CRM servers) and requires a large database to store, access, and perform query operations or methods on the recorded data.

The data abstraction layer 306c is generated to be compatible with a relational database management system (e.g., MySQL or MariaDB) that is used for interacting and performing query methods or operations on the data available on the application 302c and data stored in data storages $504_1$ to $504_N$. In some embodiments, data storages $504_1$ to $504_N$ can be implemented, for example, with a cluster of servers, and system 116 functions to control and coordinate storage among the various data storages.

Data abstraction layer engine 304c can operate similar to the data abstraction layer engines 304a and 304b described with reference to FIGS. 3 and 4.

The system 116 may add or remove a number of data storages $510_1$ to $510_N$ as the amount of data to store therein increases or decreases. In some embodiments consistent with FIGS. 1 and 2, system 116 may be any of application servers $200_1$ to $200_N$, and a cluster of data storages $504_1$ to $504_N$ may include tenant data storage 122, system data storage 124 among other databases. The system 116 includes the data abstraction layer server engine 502 that may be in part, included in API 232 and system process space 202. In some embodiments, the data abstraction layer server engine 502 includes, implements, or provides a large set of tables and libraries for different applications such as applications 302a-c. The data abstraction layer server engine 502 is configured to enable users to download a subset of the tables and libraries whose data structure and/or schema matches the data structure and/or schema of the data that the application 302c is configured to provide to the users.

Example Tables

FIG. 6 illustrates an example of a key-value pair objects table 600 implemented in a persistent and flexible data abstraction layer according to some embodiments. In key-value pair objects table 600, the keys and values are stored in two columns: a string column for a key, and a byte column for a value. For example, as shown in FIG. 6, the key column includes keys 602a-c and the value column includes values

604*a-c*. Each value 604*a*, 604*b*, and 604*c* is unique to and associated with each key 602*a*, 602*b*, and 602*c*, respectively.

According to some embodiments, the persistent and flexible data abstraction layer 306 of the present disclosure exposes the structures of the data access layer, such as the key-value pair objects table 600. The data abstraction layer engine 304 provides or supports an object interface 320 through which a user can generate, add, delete, modify, or otherwise configure one or more key-value pair tables with a similar data structure as the key-value pair objects table 600 (e.g., BerkeleyDB). Key-value pair data objects are available or exposed to users to interface therewith by a <namespace> parameter. For example, users may create and/or drop a key-value pair object by using the <namespace> parameter. For example, the <namespace> parameter may be used to create a key-value pair object by making a call to <create(namespace)> method and a <drop(namespace)> method may be called to delete or drop the key-value pair object.

The persistent and flexible data abstraction layer may be configured to provide or support certain functionalities for the data stored in the key-value pair objects table 600. For example, these functionalities may be <create> to create a new namespace (e.g., database), <drop> to delete a namespace, <store> to store, <get> to retrieve, and <delete> to delete one or batch of key-value pair objects. Other examples of these functionalities may be <keys> to retrieve a list of the keys in a namespace; for example, calling <keys> against the key-value pair objects table 600 would return a list of strings containing {'object-key-1', 'object-key-2', 'object-key-3'}. These functionalities may also include <size> which is used to retrieve a count of the key-value objects stored in a namespace. In some examples, a user may want to retrieve the value associated with an object-key-1 602*a*, as such, the user may send a query request to a relational data storage system by implementing a utility class with <get(object-key-1)>, which results in the relational data storage system responds to the user's query request with value 604*a* or vice versa.

In some embodiments, key-value pair objects tables in the persistent and flexible data abstraction layer may be identified or named based on their data patterns, data format, data structures, and/or schemas. For example, the key-value pair objects table 600 may be named as <k-v-col0-string-col1-bytes>.

Figure 7:
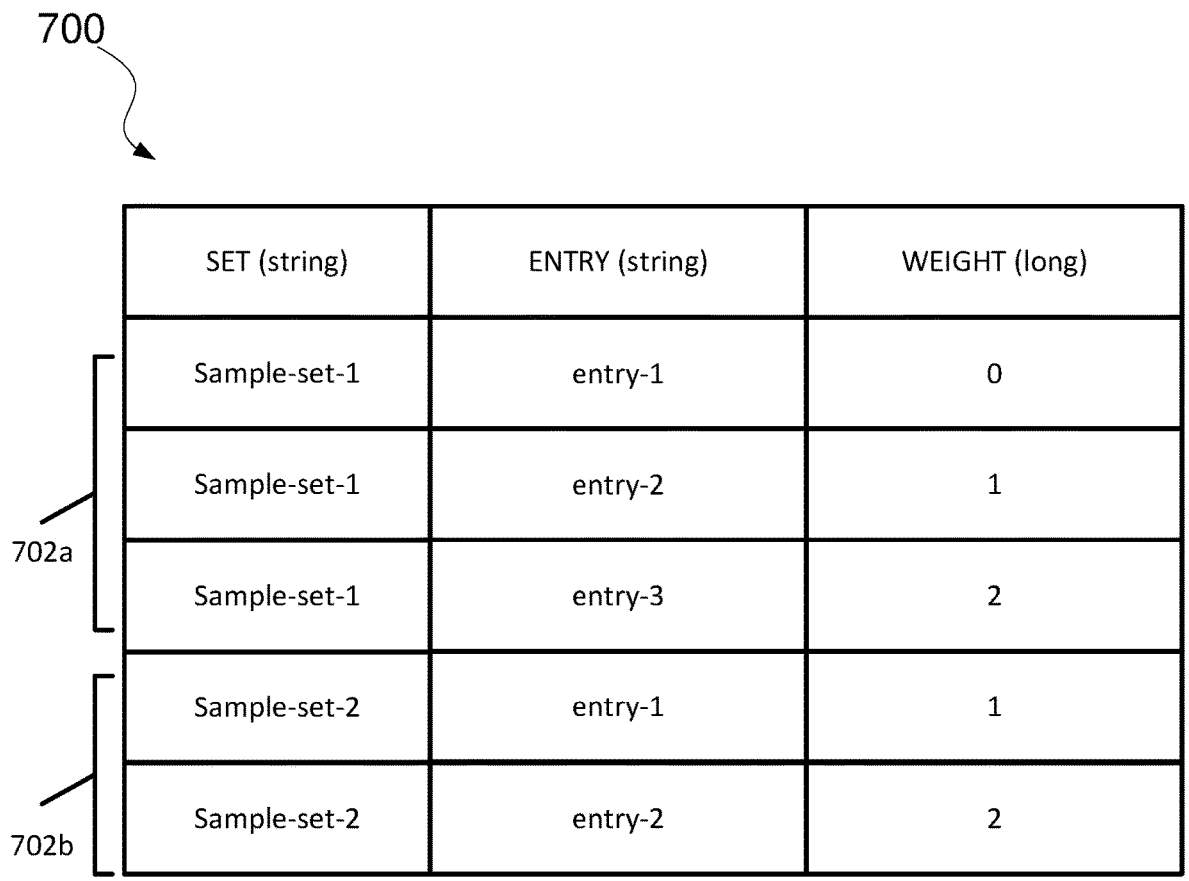
FIG. 7 illustrates an example of a sorted sets table according to some embodiments.

FIG. 7 illustrates an example of a sorted set objects table 700 according to some embodiments. In sorted set objects table 700, the sets are stored in three columns: a string column for a set name, a string column for an entry, and a long column for a weight of the entry. A sorted set object table 700 may include a plurality of sets where each set is identified or associated with a unique string as a set name and a number of entries, where each entry is associated with a numerical value as a weight of the entry. The entries of each set may be sorted based on their weights. For example, as shown in FIG. 7, sorted set objects table 700 includes two sets of 702*a* and 702*b*. Set 702*a* is identified with a name of sample-set-1 and has three entries of entry-1, entry-2, and entry-3, with weights of 0, 1, and 2, respectively.

According to some embodiments, the persistent and flexible data abstraction layer 306 of the present disclosure exposes the structures of the data access layer, such as the sorted set objects table 700. The data abstraction layer engine 304 provides or supports a sets interface 322 through which a user can generate, add, delete, modify, or otherwise configure one or more sorted set objects tables with a similar data structure of the sorted set objects table 700. The sorted set objects are available or exposed to users to interface therewith by a <namespace> parameter. For example, users may create and/or drop a sorted set object by using the <namespace> parameter. For example, a <create (namespace)> method may be used to create a sorted set object and a <drop(namespace)> may be called to delete or drop a sorted set object.

The persistent and flexible data abstraction layer may be configured to provide or support certain functionalities for the data stored in the sorted set objects table 700. For example, these functionalities may be <create> to create a new namespace (e.g., database), <drop> to delete a namespace, <add> to add an entry with a weight associated thereto, <delete> to delete an entry from a set object. Other examples of these functionalities may be <entries> to retrieve the entries or pairs of entry-weight objects from a set, where their weight is between two given values, and are ordered either ascending or descending. It is also optionally possible to paginate through the retrieved entries or pairs of the entry-weight objects. For example, calling <entries> for the set 702*a* against the sorted set objects table 700 returns a list of strings containing {'entry-1', 'entry-2', 'entry-3'}; and calling <get> on the same, returns {'entry-1'=>0, 'entry-2'=>1, 'entry-3'=>2}. Other examples of these functionalities may be <union> to get a union of two or more sets, <intersection> to get the intersection of two or more sets, and <pop> to atomically retrieve and remove one or more entries from a set; this is particularly useful for using sorted sets as a producer/consumer buffer or similar use cases.

In some embodiments, sorted set objects tables in the persistent and flexible data abstraction layer may be identified or named based on their data patterns, data format, data structures, and/or schemas. For example, the sorted set objects table 700 may be named as <set-col0-string-col1-string-col2-long>.

Most of these functionalities are supported by a range operation. A range may be described as <count> of the entries with weight between a <min> and a <max> value, starting from the <start> index; for example calling a <get> operation such as <get(namespace, 'sample-set-1', 1, Long.MAX_VALUE, 0, 3, true)> against the sorted set objects table 700, returns maximum of 3 entries from the sample-set-1 702*a* where weight is between 1 and <Long.MAX_VALUE> starting from index 0, returned in an ascending order.

Figure 8:
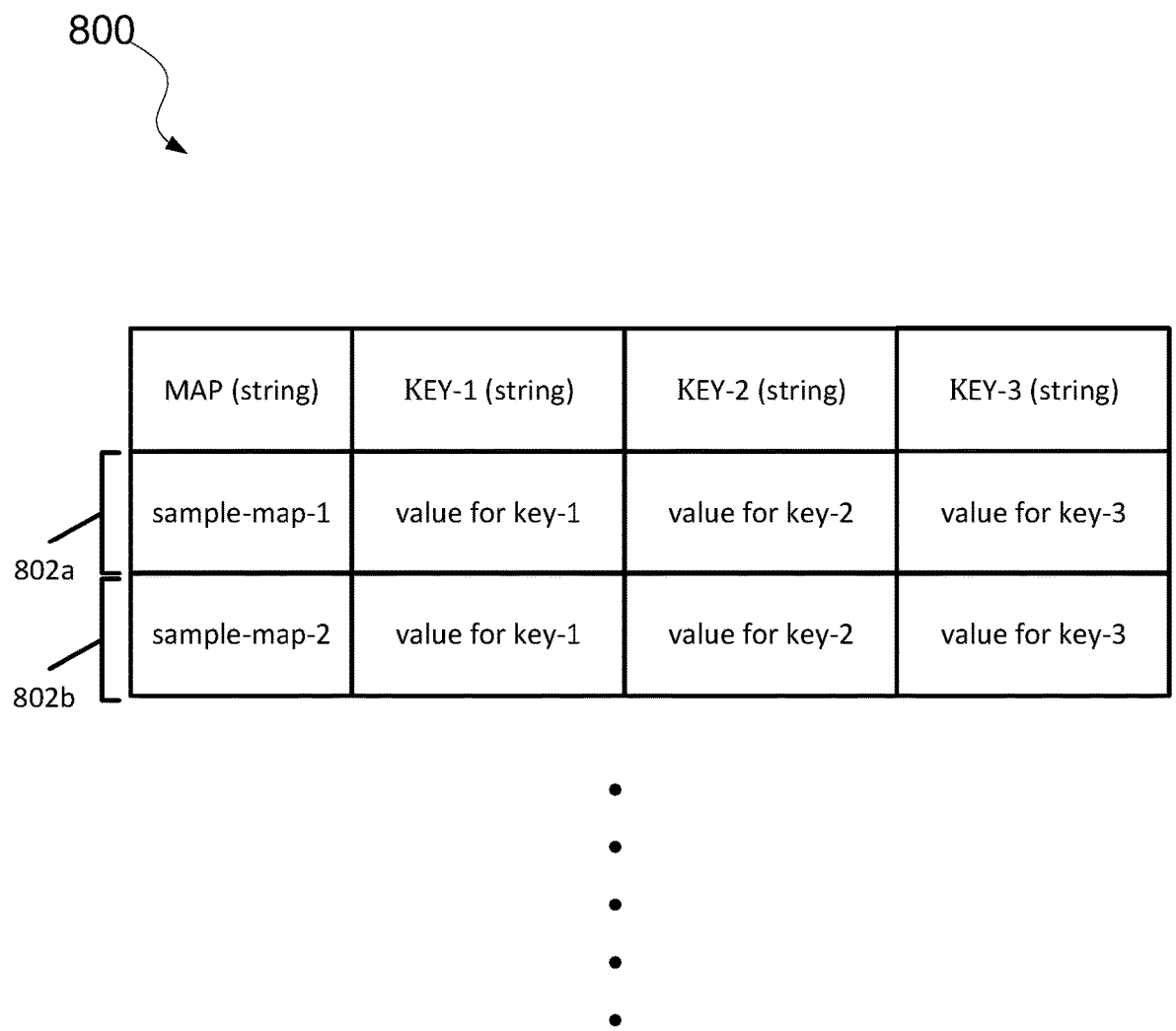
FIG. 8 illustrates an example of a maps table according to some embodiments.

FIG. 8 illustrates an example of a map objects table 800 according to some embodiments. In map objects table 800, the map objects are stored as a series of key-value pair objects, where each key-value pair object is represented as a map of a property name to a property value. In the map objects table 800, the map objects are stored in four columns: a string column for a map name and three string columns for keys, where each key column is populated with a value for that key column. For example, as shown in FIG. 8, the map objects table 800 includes a map object 802*a* with a name of sample-map-1 and a map object 802*b* with a name of sample-map-2, where each map object 802*a* and 802*b* are represented with 3 key-value pair columns. In some examples, the map objects 802*a* and 802*b* may be java script object notation (JSON)).

According to some embodiments, the persistent and flexible data abstraction layer 306 of the present disclosure exposes the structures of the data access layer, such as map objects table 800. The data abstraction layer engine 304 provides or supports a maps interface 324 through which a user can generate, add, delete, modify, or otherwise configure one or more map objects tables with a similar data structure of the map objects table 800. The map objects are available or exposed to users to interface therewith by a <namespace> parameter. For example, users may create and/or drop a map object by using the <namespace> parameter. For example, a <create(namespace)> method may be called to create a map object and a <drop(namespace)> may be called to delete or drop a map object.

The persistent and flexible data abstraction layer may be configured to provide or support certain functionalities for the data stored in the map objects table 800. For example, these functionalities may be <create> to create a new namespace (e.g., database), <drop> to delete a namespace, <store> to store a new map object with one or more key-value pair object, <delete> to delete the map objects, and <get> to retrieve one or more map objects given a query operation which defines a set of criteria to match therewith. According to some embodiments, the persistent and flexible data abstraction layer statically creates a map objects table such as the map objects table 800. When a user sends a request to add a column to the map object table 800, such as a string column for user IDs of customers of an organization, the data abstract layer add a new string column to store the customers' user IDs therein.

In some embodiments, map objects tables in the persistent and flexible data abstraction layer may be identified or named based on their data patterns, data format, data structures, and/or schema. For example, the map objects table 800 may be named as <maps-col0-string-col1-string-col2-string-col3-string>.

Figure 9:
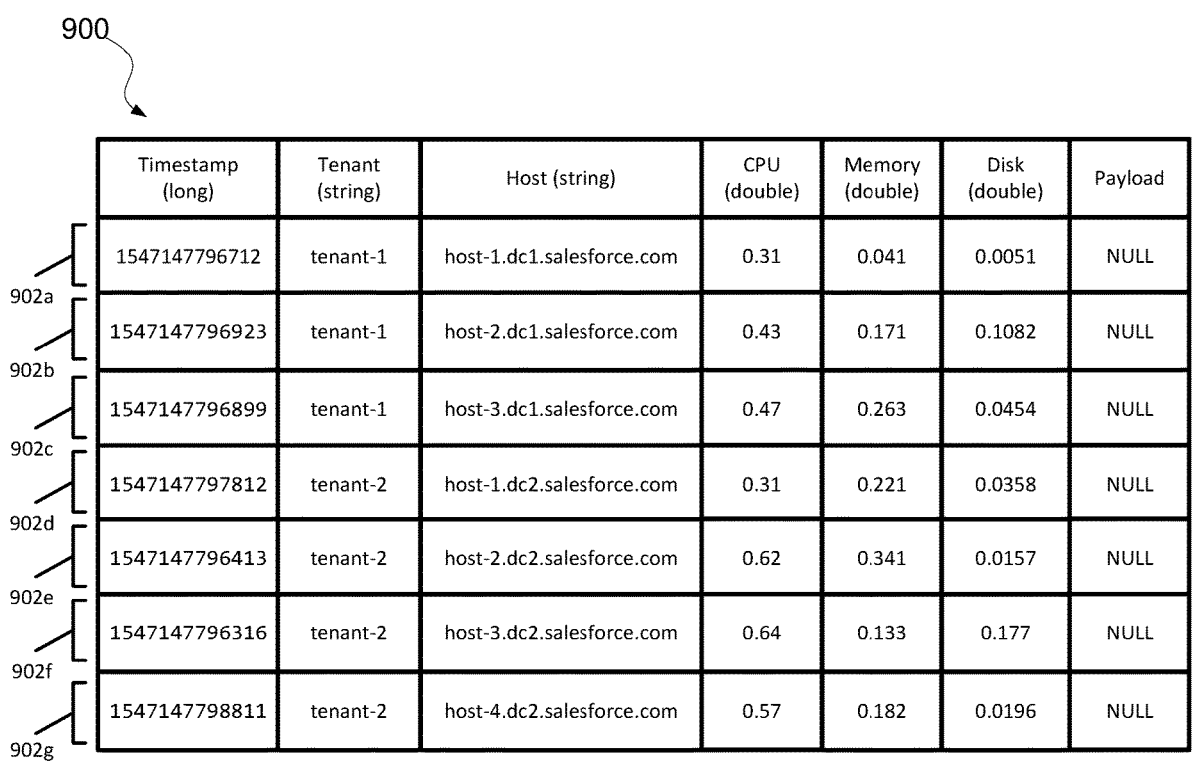
FIG. 9 illustrates an example of an events table according to some embodiments.

FIG. 9 illustrates an example of an event objects table 900 according to some embodiments. In event objects table 900, the event objects are provided by or implemented with multi-dimensional time series data points, with a long column for timestamp, two arbitrary string columns for metadata key/value pairs, three double columns for CPU usage, memory usage, and a disk usage, and an optional byte column for payload attached to each event object. A payload column in an event object may represent a name or ID for that event and in a case that the payload is NULL, the event is identified by its timestamp value which represents a time that the event has occurred. In some cases that a payload of an event object is given a value, the event is referred to as a fat event object.

According to some embodiments, the persistent and flexible data abstraction layer 306 of the present disclosure exposes the structures of the data access layer, such as the event objects table 900. The data abstraction layer engine 304 provides or supports an events interface 326 through which a user can generate, add, delete, modify, or otherwise configure one or more event objects tables with a similar data structure of the event objects table 900. The event objects are available or exposed to users to interface therewith by a <namespace> parameter. For example, users may create and/or drop an event object by using the <namespace> parameter. For example, a <create (namespace)> method may be called to create an event object and a <drop(namespace)> may be called to delete or drop an even object.

The persistent and flexible data abstraction layer may be configured to provide or support certain functionalities for the data stored in the event objects table 900. For example, these functionalities may be <create> to create a new namespace (e.g., database), <drop> to delete a namespace, <store> to store a new event in the namespace. Other examples of such functionalities are <get> to fetch one or more events in the namespace, matching a query; where the queries are defined as a map of key/value pairs, where the key is either a dimension key name or a metadata key name (e.g., Host or CPU in the event objects table 900), and values are either literal values to match exactly with (e.g., <Tenant=>'tenant-1'>) or an operator along with a value (e.g., <Tenant=>'~tenant-*'> or <CPU=>'>0.30'>). In other examples, other functionalities provided by the persistent and flexible data abstraction layer may be <expire> to expire all events in the namespace with timestamp before a given value, <count> to count number of events in the namespace, matching a query, <aggregate> to retrieve aggregated values of a dimension matching a query, <metadata> to retrieve metadata values for a given metadata key for events matching a query, and <payload> to retrieve the values of payloads in <byte[ ]> for all events in the namespace matching a query.

According to some embodiments, event objects may be internally stored or bucketed into 1-hour intervals and/or stored in separate tables based on the different dimensions and metadata keys associated with an event object. For example, an event object with dimension <d1> and metadata <m1> is stored in a separate table than an event object with dimension <d1> and metadata <m2>, or an event object with dimension <d2> and metadata <m2>, or an event object with dimension <d2> and metadata <m1>.

For example, the event objects table 900 may represent stored databases in capturing, monitoring or recording of server systems metrics. As such, every time a user accesses a URL of a client or an organization, an event object (e.g., event object 902*a*) associated with the timestamp of accessing the URL is added to the event objects table 900, where the event object 902*a* further includes or represented by the tenant column or organization's name (e.g., tenant-1) and a host column (e.g., host-1.dc1.salesforce.com), where the host column represents the name and location of the host (e.g., Salesforce host 1 in Washington D.C.). The event object 902*a* may include a CPU column for the CPU usage of the host, a memory column for an amount of memory (e.g., cache memory, or RAM memory) the host used during accessing the URL, and a disk column for an amount of a disk memory space the host used to access data and/or download the data from the URL.

In some embodiments, event objects tables in the persistent and flexible data abstraction layer may be identified or named based on their timestamp, data patterns, data format, data structures, and/or schema. For example, the event objects table 900 may be named as <01012000-14-27-col0-long-col1-string-col2-string-col3-double-col4-double-col5-double-col6-byte> where the date of creation of the event object is Jan. 1, 2000, at 2:27 pm and the event objects table 900 includes 6 columns with specific format, and/or schema same as the data pattern, data structure, and/or schema of the event objects table 900.

Operational Flow

Figure 10:
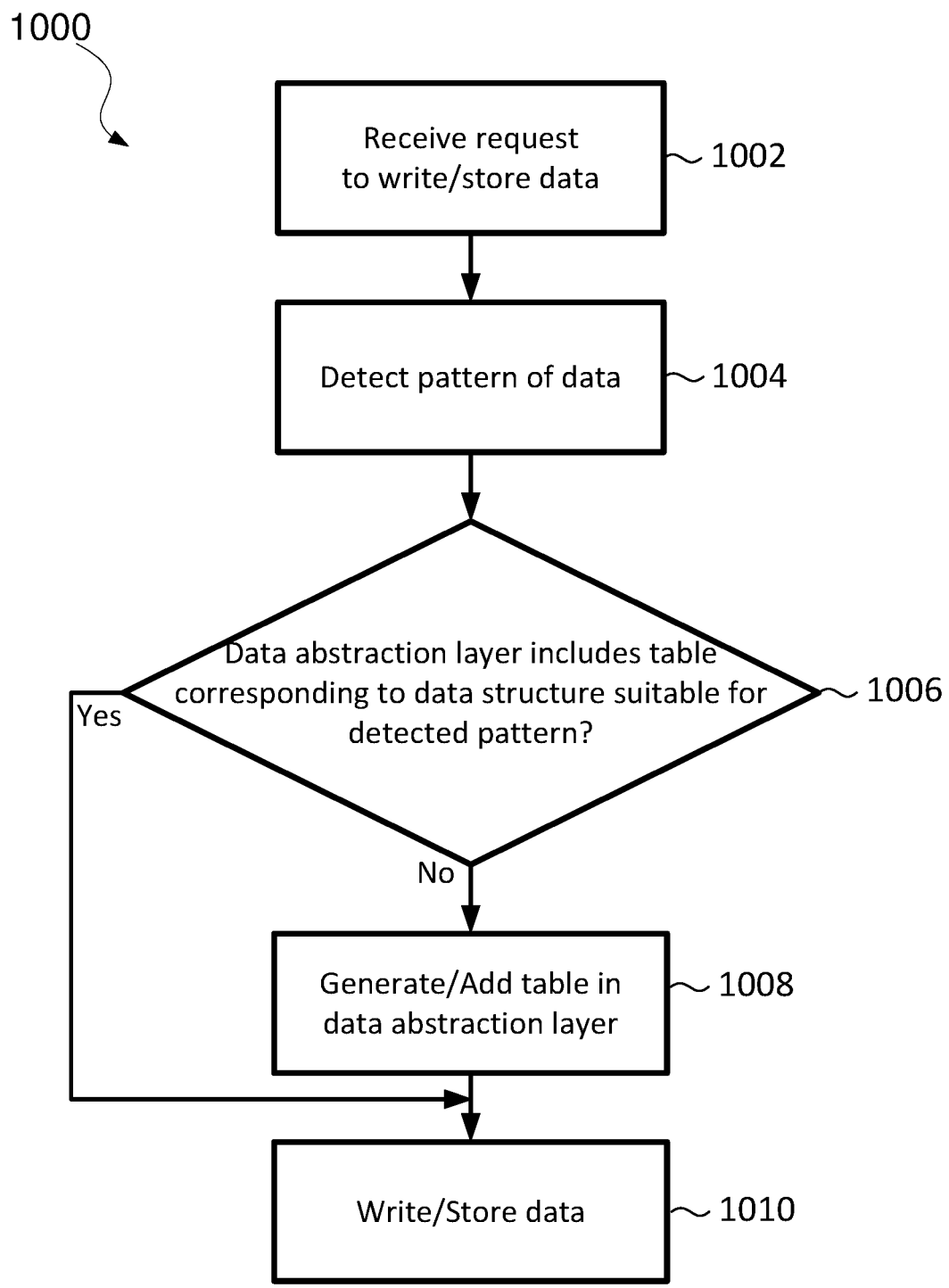
FIG. 10 illustrates a simplified diagram of a process flow for implementing a data abstraction layer according to some embodiments.

FIG. 10 illustrates a simplified diagram of a process flow 1000 for implementing a persistent and flexible data abstraction layer according to some embodiments. According to some embodiments, one or more of the processes 1002-1010 of process flow 1000 may be implemented, at least in part, in the form of executable code stored on non-transitory, tangible, machine-readable media that when run by one or more processors may cause the one or more processors to perform one or more of the processes 1002-1010. According to some embodiments, process flow 1000 can be performed by one or more computing devices illustrated or described with respect to the systems 100-500 of FIGS. 1 to 5, respectively, including system 116 and one or more user systems 112 (with applications 302a-c, data abstraction layer engines 304a-c, data abstraction layers 306a-c), with data storage 308, data storage 402, and cluster of data storages $504_1$ to $504_N$. Aspects of processes 1002-1010 of process flow 1000 have been covered in the description for FIGS. 1 to 5; and additional aspects are provided below. According to some embodiments, all or a portion of the process flow 1000 may be performed to generate and provide a persistent and flexible data abstraction layer and to configure the persistent and flexible data abstraction layer to include tables or libraries with matching data structures and/or schema with the data structures and/or schema of data in a query request by a user.

At a process 1002, a data abstraction layer engine (e.g., data abstraction layer engines 306a-c as shown in FIGS. 3 to 5) receives a query request from an application (e.g., any of applications 302a-c as shown in FIGS. 3 to 5) or user to write/store information or data in a database (e.g., data storage 308, data storage 402, or cluster of data storages $504_1$ to $504_N$). The user may interact with the data storage through the application available on the user system 112. The application may include a data abstraction layer engine (e.g., data abstraction layer engine 304a-c) and a data abstraction layer (e.g., data abstraction layer 306a-c as shown in FIGS. 3 to 5). In some examples, such user may be a representative of an organization subscribed to the CRM system 116. For example, the application may be a production server monitoring application that is connected to a CRM server (e.g., system 116) that monitors, records, and updates the status of a large number of continental CRM solutions implemented with gRPC servers and HTTP protocols (e.g., application servers $200_1$ to $200_N$). In other examples, the application may be Salesforce, Google maps, Google Earth, Gmail, Facebook, Twitter, Amazon, or any global platform that require monitoring, maintaining, updating, and recording status of their servers' status metrics and production data at a global level.

At a process 1004, the data abstraction layer engine detects types, formats, structures, schema, and/or patterns of the data queried by the user. These patterns can be, for example, single objects, collections of data, or temporal data points. The data access layer of the present disclosure recognizes that certain forms, structures, or tables are suitable for storing particular use cases or patterns of data. The forms, structures or tables of queried data on which embodiments of the present disclosure operate or focus can be key/value pairs, sorted sets, maps, and fat events. For example, in an organization subscribed to a CRM system, such as the system 116, the user may want to store data related the organization's customers with a data structure and/or schema of a map objects table with 3 string key columns for user customer ID number, user's email address, and user's home address (e.g. the map objects table 800 as shown in FIG. 8).

At a decision process 1006, the data abstraction layer engine determines whether the data abstraction layer includes a data form, table, or structure that is the same, similar, or suitable for the detected pattern of the data query. In some examples, the data abstraction layer may include tables or APIs with data structures and/or schema similar to the key-value pair objects table 600, sorted set objects table 700, map objects table 800, and/or event objects table 900 with reference to FIGS. 6 to 9. In some embodiments, as discussed above, every table in the data abstraction layer is identified or named in hash tables in the data abstraction layer by its data pattern, data format, data structure, and schema. As such, in some embodiments, the data abstraction layer engine searches the hash tables in the data abstraction layer (e.g., with an interface, API, or name) to find a table with the same or similar data structure and/or schema of the queried data.

If the data abstraction layer engine finds a table with a matching or suitable data structure and/or schema for the structure, schema, and/or pattern of the queried data, the process flow 1000 proceeds to a process 1010 where the data abstraction layer uses the found table or API to provide or perform the store/write query request. In some examples, the query request may be any query operation or method in the scope of this disclosure as discussed herein.

If at the decision process 1006, the data abstraction layer engine determines that a table with a matching or suitable data structure and/or schema as the data structure, schema, and/or pattern of the queried data does not exist in the data abstraction layer, the process flow 1000 proceeds to a process 1008. At process 1008, the data abstraction layer engine generates or adds a new table with matching or suitable data structure and/or schema as the data structure, schema, and/or pattern of the queried data.

In some embodiments, to accomplish this, data abstraction layer engine implements, exposes, or provides the user of the application with a suitable interface (e.g., objects interface 320, sets interface 322, maps interface 324, or events interface 326) to interact with the data abstraction layer to add, generate, or configure the new table with the matching or suitable data structure, schema, or form (e.g., key/value pairs, sorted sets, maps (key/value pairs), and fat events (time-series data)) as the pattern of queried data. The interface defines or allows the user to perform operations, such as creating new namespaces (i.e., database), deleting an existing namespace, storing, retrieving, or deleting a single or a batch of key/value pairs, getting a list of all keys in a namespace, getting a count of all objects stored in the namespace, adding or removing an entry with a weight to a set, retrieving entries or pairs of entry/weight from a set, getting the union or intersection of two sets, retrieving and removing entries from a set, storing or deleting a map, retrieving a map, storing or fetching events, expiring events in a namespace, counting number of events, and retrieving payloads for events.

Thereafter, the data abstraction layer names the new table, for example, based on its data structure and/or schema and stores it in a hash table in the data abstraction layer, findable based on its data formats, data patterns, data structure and/or schema.

In some embodiments consistent with FIG. 3, application 302a uses a small data storage such as a data storage 308 which is implemented with the relational database management system H2. As such, the data abstraction layer engine 304a generates or adds the new table with a matching data structure and/or schema as the data structure and/or schema of the queried data compatible with the relational database management system H2.

In some embodiments consistent with FIGS. 3, 4, and 5, applications 302b and 302c use data storages 802 and cluster of databases or data storages $504_1$ to $504_N$ which are implemented with the relational database management system MySQL. As such, the data abstraction layer engines 304b and 304c generate or add the new table with a matching data structure and/or schema as the data structure and/or schema of the queried data compatible with the relational database management system MySQL.

In some embodiments consistent with FIGS. 3, 4, and 5, the data abstraction layer engines 304a-c and the data abstraction layers 306a-c are agnostic and independent with respect to a size of the application (e.g., applications 302a-c) or the size of the data storages (e.g., data storage 308, data storage 402, and cluster of data storages $504_1$ to $504_N$). A data abstraction layer engine may generate and provide a default data abstraction layer for any application and add new tables and/or abstractions to the data abstraction layer, based on data patterns, data format, data structures, and/or schemas of the data that are queried by users. For example, the data abstraction layer 306a may be implemented for applications 302a and/or 302c.

The process flow 1000 then proceeds to a process 1010 where the data abstraction layer engine uses the new table to provide, perform, or complete the store/write query request. Thus, in contrast to other techniques, with the systems and methods of the present disclosure, the data abstraction layer does not create or use the cross-references, dependencies, joins, and constraints between and among available tables or libraries for certain data forms of (e.g., key/value pairs, sorted sets, maps, and fat events) that can make up a substantial amount of the data access layer. As such, the data abstraction layer and engine of the present disclosure eliminate or reduce some of the complexities around relational databases, such as joins, constraints, and stored procedures. In this way, the query operation for an application potentially becomes faster.

In some embodiments, process flow 1000 is implemented in one or more computing devices, such as servers, desktops, laptops, notebooks, smartphones, and the like. Each computing device may include one or more processors coupled to or in communication with memory. Operation of the one or more computing devices is controlled by the processors. The processors may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing devices.

In some embodiments, one or more actions illustrated in processes 1002-1010 may be performed for any data transfer model or architecture (e.g., a client-server model or an embedded system model). It is also understood that additional processes may be performed before, during, or after processes 1002-1010 discussed above. It is also understood that one or more of the processes of process flow 1000 described herein may be omitted, combined, or performed in a different sequence as desired.

Memory may be used to store software executed by computing devices and/or one or more data structures used during operation of computing devices. Memory may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Unless specifically stated otherwise as apparent from the following discussion, it is appreciated that throughout the description, discussions utilizing terms such as "determining," "obtaining," "inserting," "executing," "receiving," "transmitting," "identifying," "generating," "determining," "traversing," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modifications, changes, and substitutions is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein.

What is claimed is:

1. A method for providing simple and flexible data access, the method comprising:
   receiving, at a data access layer associated with an application running on one or more processors of a computer system, a request for accessing data in a memory of the computer system storing one or more relational databases;
   identifying, at the one or more processors, a pattern of the data of the request;
   determining, at the one or more processors, whether the data access layer includes a table having a structure of one of key/value pair, sorted set, map, or event that matches with a structure of queried data in the request and is suitable for accessing the data of the request based on the identified pattern;
   if the data access layer includes the table with suitable structure, using that table for accessing the data of the request; and
   if the data access layer does not include any table with the suitable structure:
      generating a new table, based on one or more tables of abstractions in the data access layer including at least one of a key-value pair objects table, a sorted set object table, a map objects table, and an event objects table, wherein the new table has the structure of one of key/value pair, sorted set, map, or event that matches with the structure of the queried data in the request, corresponding to the one or more tables of abstractions;
      presenting an interface suitable to the structure of the queried data through which a user can direct one or more operations to configure the generated table;
      indexing the generated new table in a form based on a data format or a data structure of the generated new table;

locating the generated new table by a hash function according to the indexed form in response to the request; and accessing the data of the request based on the structure of the new table at the data access layer without resorting to cross-references and dependencies between the one or more relational databases.

2. The method of claim 1, wherein the interface presented is specific to the identified pattern of data of the request.

3. The method of claim 1, wherein a table for the structure of a key/value pair comprises a first column for a key and a second column for a value.

4. The method of claim 1, wherein a table for the structure of a sorted set comprises a first column for a set name, a second column for an entry, and a third column for a weight associated with the entry.

5. The method of claim 1, wherein a table for the structure of a map comprises a column for each key in the map.

6. The method of claim 1, wherein a table for the structure of an event comprises a first column for a timestamp and a second column for a payload.

7. The method of claim 1, comprising generating a name for the generated table, wherein the generated name of the table is based upon the structure of the table.

8. The method of claim 1, wherein the pattern of the data is one of single object, collection of data, and temporal data point.

9. A non-transitory machine-readable medium comprising executable code which when executed by one or more processors associated with a computer are adapted to cause the one or more processors to perform a method for providing simple and flexible data access, the method comprising:

receiving, at a data access layer associated with an application running on one or more processors of a computer system, a request for accessing data in a memory of the computer system storing one or more relational databases;

identifying, at the one or more processors, a pattern of the data of the request;

determining, at the one or more processors, whether the data access layer includes a table having a structure of one of key/value pair, sorted set, map, or event that matches with a structure of queried data in the request and is suitable for accessing the data of the request based on the identified pattern;

if the data access layer includes the table with suitable structure, using that table for accessing the data of the request; and if the data access layer does not include any table with the suitable structure:

generating a new table, based on one or more tables of abstractions in the data access layer including at least one of a key-value pair objects table, a sorted set object table, a map objects table, and an event objects table, wherein the new table has the structure of one of key/value pair, sorted set, map, or event that matches with the structure of the queried data in the request, corresponding to the one or more tables of abstractions;

presenting an interface suitable to the structure of the queried data through which a user can direct one or more operations to configure the generated table;

indexing the generated new table in a form based on a data format or a data structure of the generated new table;

locating the generated new table by a hash function according to the indexed form in response to the request; and accessing the data of the request based on the structure of the new table at the data access layer without resorting to cross-references and dependencies between the one or more relational databases.

10. The non-transitory machine-readable medium of claim 9, wherein the interface presented is specific to the identified pattern of data of the request.

11. The non-transitory machine-readable medium of claim 9, wherein a table for the structure of a key/value pair comprises a first column for a key and a second column for a value.

12. The non-transitory machine-readable medium of claim 9, wherein a table for the structure of a sorted set comprises a first column for a set name, a second column for an entry, and a third column for a weight associated with the entry.

13. The non-transitory machine-readable medium of claim 9, wherein a table for the structure of a map comprises a column for each key in the map.

14. The non-transitory machine-readable medium of claim 9, wherein a table for the structure of an event comprises a first column for a timestamp and a second column for a payload.

15. The non-transitory machine-readable medium of claim 9, wherein the pattern of the data is one of single object, collection of data, and temporal data point.

16. A system for providing simple and flexible data access, the system comprising:

a memory containing machine readable medium storing machine executable code; and one or more processors coupled to the memory and configurable to execute the machine executable code to cause the one or more processors to:

receive, at a data access layer associated with an application running on one or more processors of a computer system, a request for accessing data in a memory of the computer system storing one or more relational databases;

identify, at the one or more processors, a pattern of the data of the request;

determine, at the one or more processors, whether the data access layer includes a table having a structure of one of key/value pair, sorted set, map, or event that matches with a structure of queried data in the request and is suitable for accessing the data of the request based on the identified pattern;

if the data access layer includes the table with suitable structure, use that table for accessing the data of the request; and if the data access layer does not include any table with the suitable structure:

generate a new table, based on one or more tables of abstractions in the data access layer including at least one of a key-value pair objects table, a sorted set object table, a map objects table, and an event objects table, wherein the new table has the structure of one of key/value pair, sorted set, map, or event that matches with the structure of the queried data in the request, corresponding to the one or more tables of abstractions;

present an interface suitable to the structure of the queried data through which a user can direct one or more operations to configure the generated table;

index the generated new table in a form based on a data format or a data structure of the generated new table;

locate the generated new table by a hash function according to the indexed form in response to the request; and access the data of the request based on the structure of the new table at the data access layer without resorting to cross-references and dependencies between the one or more relational databases.

17. The system of claim 16, wherein the interface presented is specific to the identified pattern of data of the request.

18. The system of claim 16, wherein the pattern of the data is one of single object, collection of data, and temporal data point.

* * * * *